United States Patent [19]

Stout

[11] 3,884,191
[45] May 20, 1975

[54] ANIMAL BATHING AND DRYING APPARATUS

[76] Inventor: Pansy M. Stout, 206 Christine Dr., Sacramento, Calif. 95815

[22] Filed: Feb. 21, 1974

[21] Appl. No.: 444,369

[52] U.S. Cl. .............................................. 119/158
[51] Int. Cl. ........................................... A01k 13/00
[58] Field of Search ................. 119/1, 15, 158, 160

[56] References Cited
UNITED STATES PATENTS

| | | | |
|---|---|---|---|
| 1,760,017 | 5/1930 | Smoot............................ | 119/158 X |
| 3,749,064 | 7/1973 | Weinstein et al................... | 119/158 |

Primary Examiner—Louis G. Mancene
Assistant Examiner—J. N. Eskovitz
Attorney, Agent, or Firm—Blair & Brown

[57] ABSTRACT

An animal bathing and drying apparatus for dogs and the like including a container wherein there is provided a means for spraying water and/or cleaning solution onto the animal being bathed, and wherein there is also provided a bottom wall adapted to be inclined by the weight of an animal thereon for draining the water. Drying air is forced through the same pipes used for the water spray after the water is shut off. There is further provided an adjustable member for engaging the neck of the animal to restrain the animal during bathing and drying.

3 Claims, 6 Drawing Figures

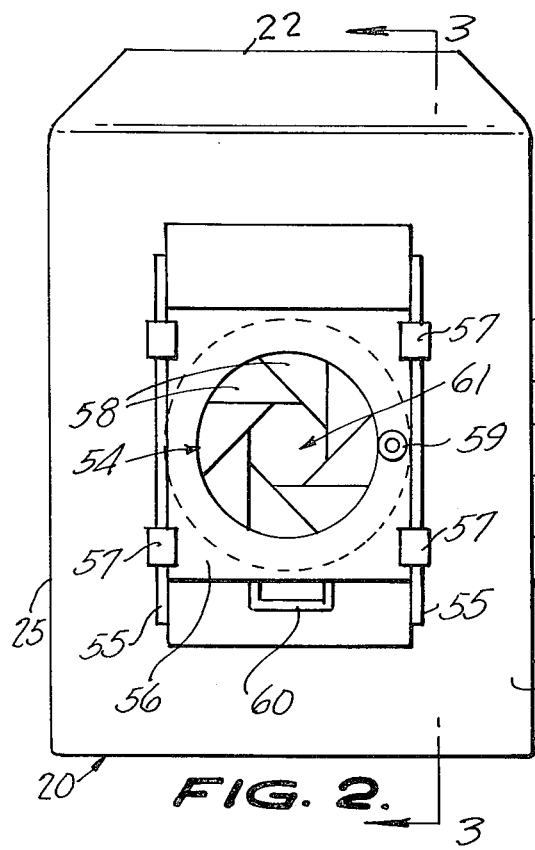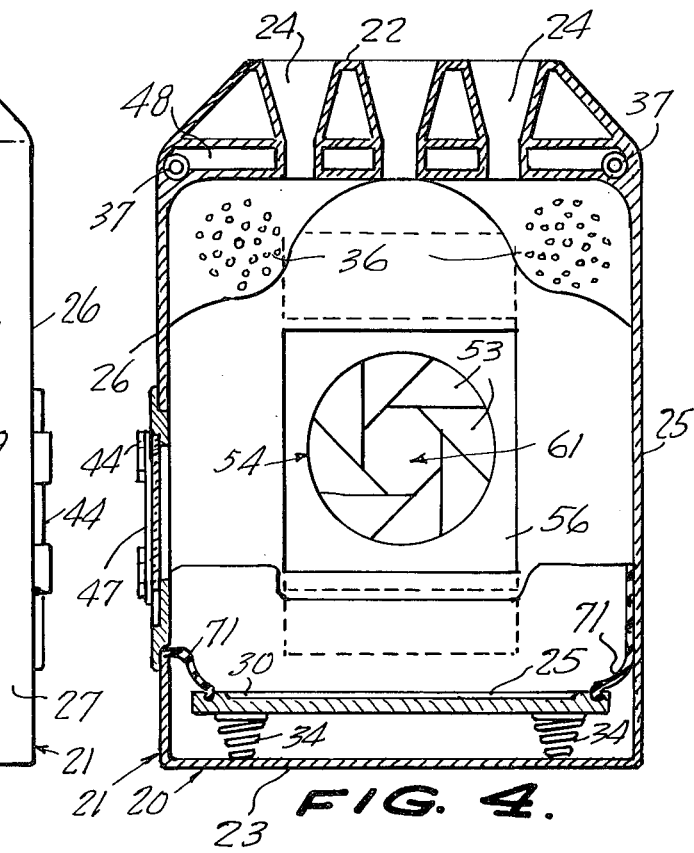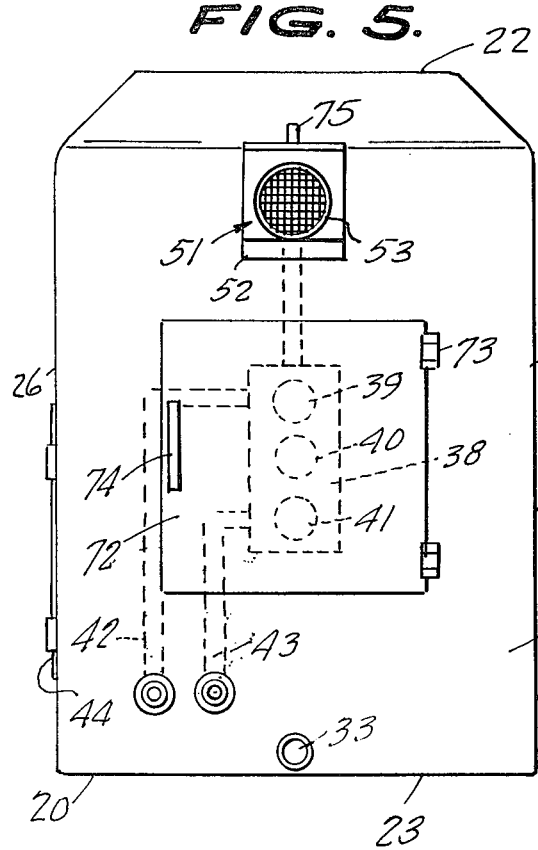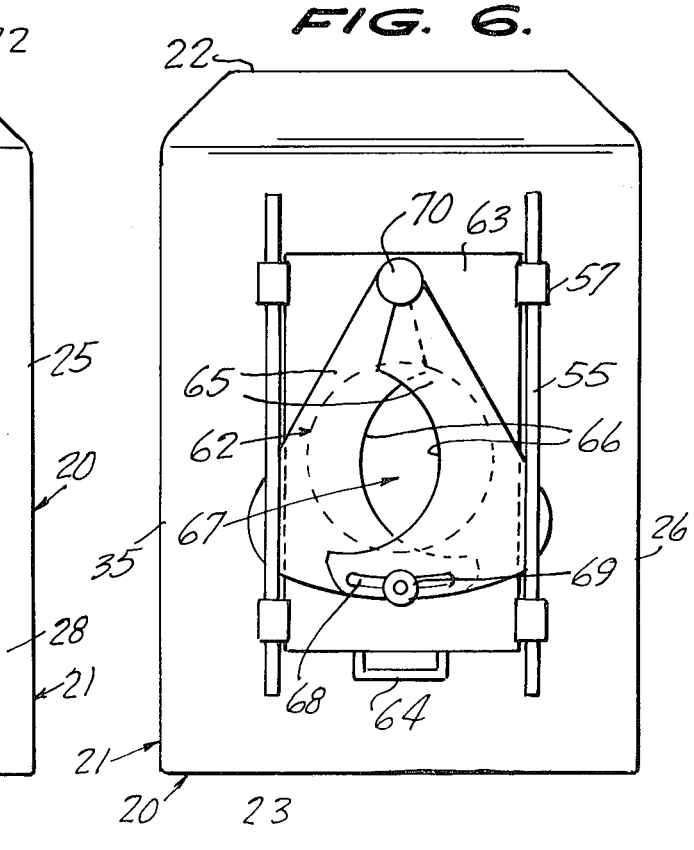

ANIMAL BATHING AND DRYING APPARATUS

BACKGROUND OF THE INVENTION

Field of the Invention

The present invention relates to bathing and drying devices for animals such as dogs.

SUMMARY OF THE INVENTION

An animal bathing and drying device is provided that includes an access door for permitting the dog or other animal to be positioned in the device. A piping and spray system for introducing hot or cold water and drying air into the device to bathe and dry the animal is provided. Further there is provided an adjustable member for engaging the neck of the dog or other animal to restrain the animal during the bathing. There is further provided a means for conveniently draining water out of the device to a suitable location.

The primary object of this invention is to provide an animal bath that permits an animal, such as a dog, to be conveniently and efficiently bathed and dried.

Still another object of the present invention is to provide an animal bath that is ruggedly constructed and simple and efficient to use and which is relatively simple and inexpensive to manufacture.

Other objects and advantages will become apparent in the following specification when considered in light of the attached drawings.

BRIEF DESCRIPTION OF THE DRAWINGS

FIG. 2 is an end elevational view of the device taken generally on the line 2—2 of FIG. 1;

FIG. 4 is a sectional view, taken on the line 4—4 of FIG. 3;

FIG. 5 is an end elevational view looking at the opposite end from that shown in FIG. 2; and FIG. 6 is an end elevational view similar to FIG. 2 but illustrating a modified type of restraining device for the animals neck.

DESCRIPTION OF THE PREFERRED EMBODIMENT

Figure 3:
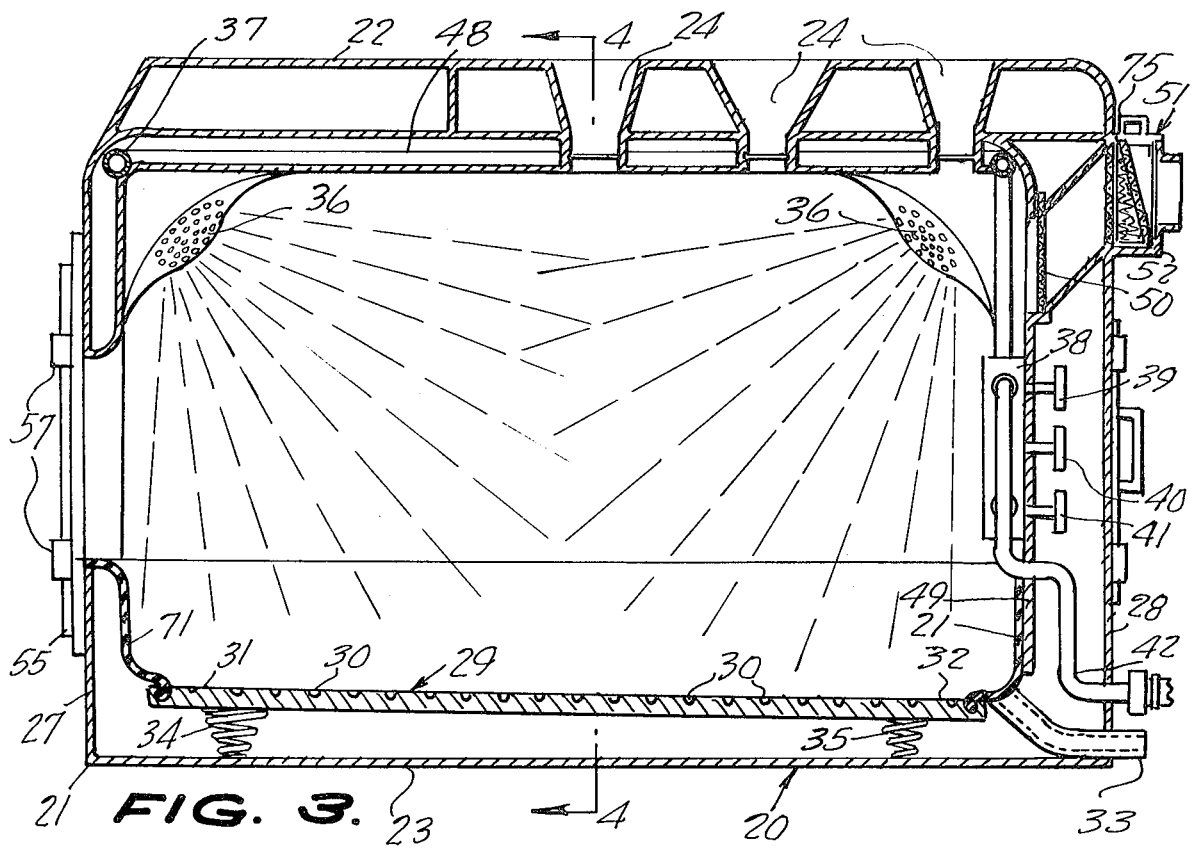
FIG. 3 is a sectional view, taken on the line 3—3 of FIG. 2.
Figure 1:
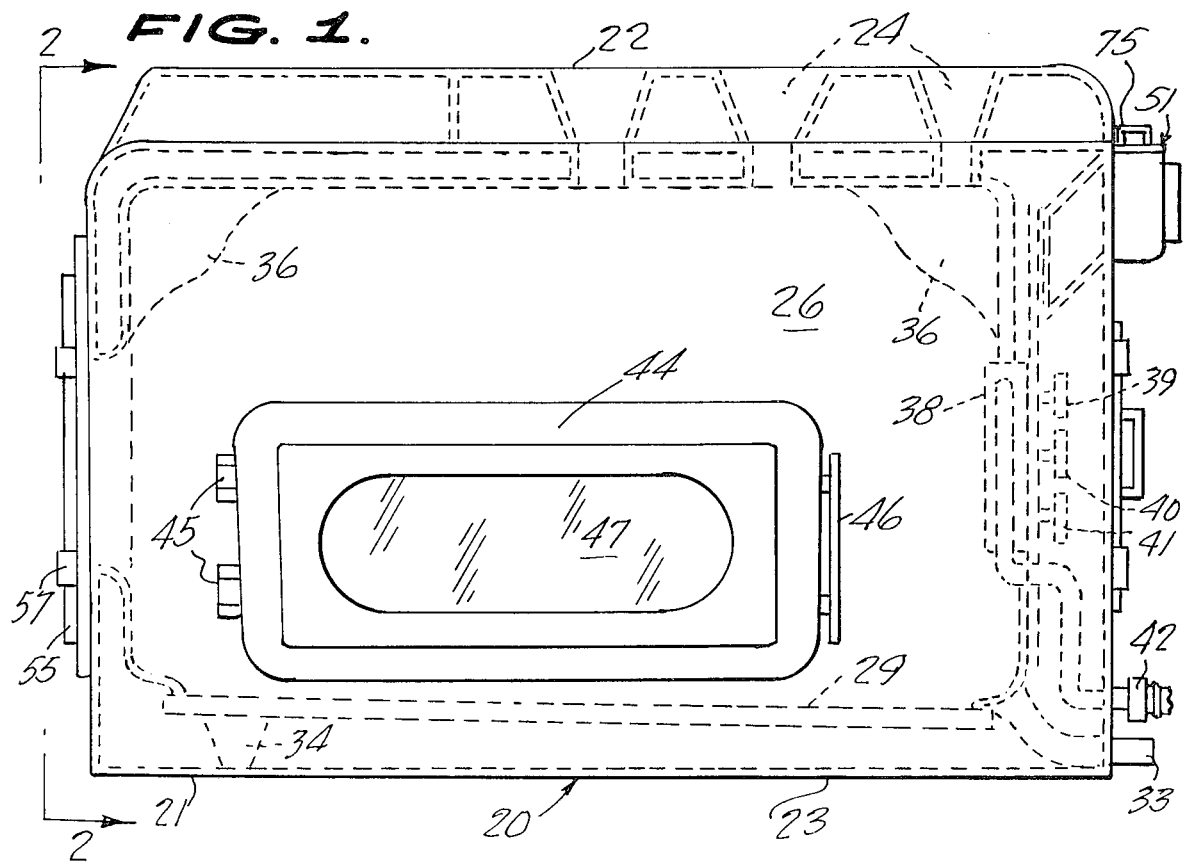
FIG. 1 is a side elevational view of the animal bath of the present invention.

Referring now to the drawings in detail, wherein like reference characters indicate like parts throughout the several figures, the reference numeral 20 indicates the animal bathing and drying device of the present invention that includes a hollow housing 21 having a top section 22 as well as a horizontally disposed bottom wall 23, FIG. 3. The top section 22 is provided with ports or openings 24 therein whereby disinfectant, soap or the like is introduced into the interior of the device to facilitate the cleaning of the dog or other animal being bathed. The housing 21 includes side walls 25, 26 as well as front and back walls 27, 28.

Arranged in the lower portion of the device is a bottom member 29 which is arranged so that the front end 31 is at a slightly higher elevation than the rear end 32 when a dog's weight is supported thereon whereby water will drain out through the drain pipe 33, FIG. 3. The base member or supporting member 29 is provided with a plurality of grooves 30 or other anti-slip surface means to help prevent the dog from slipping while being bathed. Large springs 34 support the front end 31 of the base member 29, the smaller or weaker springs 35 support the rear end 32 in order to maintain the member 29 in the slightly inclined position when supporting a dog.

Mounted in the upper portion of the housing are spray members 36 that have pipes 37 connected thereto, and the pipes 37 are connected to a control box 38. Suitable control knobs or handles 39, 40 and 41 are provided for respectively controlling the flow of hot water, cold water and drying air through the control box 38, FIG. 3. The numerals 42 and 43 indicate the pipes or hoses or lines used for connecting the control box 38 to a suitable source of hot and cold water as well as drying air.

Mounted in a suitable location such as on one side of the device is an access door 44 that permits the dog or the animal to be placed in and removed from the bathing device. The door 44 is hingedly connected in place by means of hinges 45, and a handle 46 is provided for facilitating the manual movement of the door 44. A window 47 in the door 44 permits a person to observe the condition of the animal being bathed.

A space 48 in the housing 21 provides clearance for members such as the pipes 37.

A vertically disposed wall section 49 in the rear portion of the device provides a support for the control unit 38. A screen 50 may be mounted as shown covering an outlet from the housing 21. A filter unit 51 is provided with a removeable or replaceable filter piece 52, and the filter unit has a fitting 53 thereon whereby a suitable conduit, hose or the like can be connected thereto. Air exhausting through the screen 50 and filter unit 51 will have hair and other foreign material trapped against escape from the housing 21. A restraining member 54, as shown in FIG. 2, restrains the animal during bathing and drying, and includes a vertically adjustable support member 56 that has collars 57 that are adjustably mounted on guide rods 55. The member 54 includes a plurality of moveable elements 58 that can be adjusted by means of a knob or handle 59 whereby the effective size of the opening 61 can be varied as desired, and the animal's neck is adapted to extend through the opening 61. The numeral 60 indicates a handle that can be used for raising or lowering the entire mechanism 54 so as to be able to place this mechanism at desired locations as for example to accomodate animals of different heights.

Attention is now directed to FIG. 6 of the drawings wherein there is illustrated a modified type of animal restraining mechanism indicated generally at 62. The mechanism 62 is mounted on a vertically adjustable support member 63 that has bushings or collars 57 that adjustably engage vertically disclosed guide rods 55. The support member 63 can be moved up or down by means of a handle 64. The mechanism 62 includes a pair of generally triangular elements 65 that each have an arcuate or curved groove 66 therein so that by changing the position of the element 65 the size of the opening 67 can be varied as desired. The elements 65 may be operatively connected together by means of a securing element 69 that extends through cooperating slots 68. The upper ends of the elements 65 may be pivotally supported as at 70.

Sealing strips 71 made of suitable material such as rubber serve to prevent the water from splashing out of its proper location within the housing 21.

A door 72 is hingedly connected in place as at 73, and a handle 74 is provided for opening and closing the door 72. A carrying handle 75 is arranged as shown for facilitating the moving of the device from place to place as desired.

From the foregoing, it will be seen that there has been provided an animal bath, and in use with the parts arranged as shown in the drawings, an animal, such as a dog, is adapted to be arranged in the device and then with the water supplied to the shower heads 36, the dog or other animal can be bathed in the desired manner. The water after bathing or washing the animal will drain down the inclined base member 29 and oute through the drain pipe 33 to a suitable location. Hot or warm air is then blown over the animal to dry it.

The door 44 can be used to gain entry to the interior of the device so that for example by swinging the door 44 open by means of the handle 46, the dog can be placed in or removed from the device. The window 47 permits a person to observe the interior of the device when in use. With a dog positioned in the housing, the dog's head will extend through the opening 61, and the member 59 is manually moved to move the element 58 to the desired location so that a comfortable snug fit is provided about the dogs neck in order to restrain the dog in the proper manner. Instead of using the mechanism 54 as shown in FIG. 2, a mechanism such as the mechanism 62 of FIG. 6 can be used. In FIG. 6 the member 69 can be loosened and then the element 65 can be moved to the desired position whereby the size of the openings 67 can be changed as desired in order to snugly receive therein the neck of the animal being bathed.

The parts can be made of any suitable material and in different shapes and sizes as desired.

As shown in the drawings the top four corners of the casing are of concaved nature to serve as spray heads, and the heads are connected by pipes enclosed between the inner casing and the outer wall.

There is also provided a floating floor 29 with horizontal grooves 30 to provide a non-slip surface, and the floor is situated within the inner casing. Two heavier springs 34 are attached under the side of the flooring, and two lighter springs 35 are arranged under the back of the flooring. Other non-slip types of surfaces can be provided besides the grooves 30 or pads can be added if desired. The weight of the animal will cause the rear springs 35 to go down so as to assure the run off of water residue.

Rubberized stripping such as the stripping 71 is attached to the front and sides of the inner casing and extends downwardly to the sides of the flooring, and flexible strippping is also attached to the back of the flooring extending downward to the water drainage so as to prevent water run off drainage from lying under the floor.

The animal entrance on the side of the apparatus makes placement and removal of the animal easier and safer. A window 47 is arranged in the door 44 to permit the owner to see progress of the animal during bathing. If desired the entrance can be arranged in other locations.

Several different types of securing devices such as the device 54 or the device 62 can be provided for restraining the neck and head of the animal. In FIGS. 2 and 4 there is illustrated shutter type wherein there is provided a plurality of moveable hard rubber like strips 58 that can be tightened or loosened by means of a lever or knob 59 to form an octagonal opening 61 of a desired size. In the device 62, two large triangular shaped shutters 65 can be opened and closed to form various sized oval openings 67. Both type of head openings are moveable up and down by moving a member such as the member 56 or the member 63 up or down depending on the height of the animal.

The filter 51 helps eliminate loose flying hair. The filter can be placed in other locations on the machine.

Having thus described the preferred embodiment of the invention it should be understood that numerous structural modifications and adaptations may be resorted to without departing from the spirit of the invention.

What is claimed is:

1. In an animal bathing and drying apparatus, an outer housing including a top section, a horizontally disposed bottom wall and spaced parallel vertically disposed side walls, an inclined floor in the bottom of said housing, a drain pipe connected to the lower rear portion of the housing, spray heads in the upper corners of said housing, pipes connected to said spray heads, a control box having said pipes connected thereto, means for selectively delivering water and drying air to said spray heads, an access door in one side of the housing and said access door having a window therein, animal restraining means for said animal bath, access openings in the top section of the housing, an anti-slip surface on said floor, flexible sealing stripping operatively connected to said floor, large springs interposed between the front portion of the floor and the bottom of the housing, and smaller springs interposed between the rear of the floor and the bottom of the housing whereby the weight of the animal being washed and dried will cause said floor to slope to drain water therefrom.

2. A device as claimed in claim 1 wherein the animal restraining means comprises a pair of spaced parallel vertically disposed guide rods, a support member having sleeves adjustably engaging said guide rods, a plurality of moveable shutters operatively connected to said support member, and means for moving said shutters.

3. A device as claimed in claim 2 wherein the animal restraining means comprises triangular shaped elements having arcuate recesses therein, and pivot supporting means for said triangular shaped elements.

* * * * *